(12) United States Patent
Shouji et al.

(10) Patent No.: US 6,180,224 B1
(45) Date of Patent: *Jan. 30, 2001

(54) METHOD OF ABSORBING RAYS OUTSIDE A VISIBLE REGION

(75) Inventors: Masuhiro Shouji; Hiroki Katono; Takeo Ogihara; Teruo Sakagami, all of Iwaki; Osamu Tanegashima, Funabashi, all of (JP)

(73) Assignee: Nissan Chemical Industries, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/117,001

(22) PCT Filed: Jan. 29, 1997

(86) PCT No.: PCT/JP97/00196

§ 371 Date: Jul. 21, 1998

§ 102(e) Date: Jul. 21, 1998

(87) PCT Pub. No.: WO97/28227

PCT Pub. Date: Aug. 7, 1997

(30) Foreign Application Priority Data

Jan. 30, 1996 (JP) .................................................. 8-013899

(51) Int. Cl.⁷ ............................... B32B 5/16; B32B 9/04; G02B 5/20; G02B 5/26; G02B 5/22
(52) U.S. Cl. ....................... 428/323; 428/411.1; 428/689; 359/885; 252/519.5; 252/582; 252/584; 252/587; 252/588; 252/589
(58) Field of Search ..................................... 428/323, 328, 428/411.1, 688, 689; 359/885; 252/519.5, 582, 584, 587, 588, 589

(56) References Cited

U.S. PATENT DOCUMENTS

| 4,397,773 | 8/1983 | May . | |
|---|---|---|---|
| 5,368,995 | * 11/1994 | Christian et al. | 430/530 |
| 5,707,552 | * 1/1998 | Watanabe et al. | 252/309 |

FOREIGN PATENT DOCUMENTS

| 909784A1 | * 4/1999 | (EP) . |
| 2-179649 | 7/1990 | (JP) . |
| 5-238807 | 9/1993 | (JP) . |
| 406219743A | * 8/1994 | (JP) . |
| 7-21831 | 1/1995 | (JP) . |
| 8-134432 | 5/1996 | (JP) . |
| 8-165444 | 6/1996 | (JP) . |

* cited by examiner

*Primary Examiner*—Paul Thibodeau
*Assistant Examiner*—Sheeba Ahmed
(74) *Attorney, Agent, or Firm*—Frishauf, Holtz, Goodman, Langer & Chick, P.C.

(57) ABSTRACT

An absorber of rays outside the visible region. The absorber includes a base made of a transparent synthetic resin with electroconductive anhydrous zinc antimonate incorporated therein; or a base made of a transparent synthetic resin with a layer formed of a synthetic resin and electroconductive anhydrous zinc antimonate incorporated therein, for absorbing rays outside the visible region, being disposed on a surface of the base; or wherein the layer is formed by depositing electron conductive anhydrous zinc antimonate powder on a surface of the base made of a transparent synthetic resin. The electroconductive anhydrous zinc antimonate can be a powder having a molar ratio of ZnO to $Sb_2O_5$ of 0.8 to 1.2 and a primary particle size of 5 to 200 nm. The light transmittances of the absorber are high in the visible region and low in both the ultraviolet and infrared wavelength regions.

21 Claims, No Drawings

METHOD OF ABSORBING RAYS OUTSIDE A VISIBLE REGION

FIELD OF THE INVENTION

The present invention relates to absorbers of rays outside a visible region, which have optical properties that their light transmittances are high in the visible region and low in regions outside the visible region.

BACKGROUND ART

Rays of sunlight include visible rays and besides rays in wavelength regions outside a visible region, i.e., ultraviolet rays and infrared rays. These ultraviolet and infrared rays are useless for human visual activity, or rather, their absence is often preferable to their presence in that the ultraviolet rays have chemical action and the infrared rays have thermal action.

For example, it is indicated that the ultraviolet rays form the causes of sunburn of the skin and of cutaneous aging and cancer to the human body. It is also indicated that they cause deterioration such as reduction in strength, discoloration and fading to plastic products, rubber products, synthetic fibers and other various products.

On the other hand, the infrared rays raise the temperatures within rooms of houses and the like and reduce the cooling efficiency of air conditioners and the like in a season high in air temperature, for example, the summer season, so that energy is wasted.

For example, agricultural greenhouse facilities are constructed by covering a plantation atmosphere with a covering material. However, any covering material used heretofore is not particularly designed as to performance that rays within a particular wavelength region are selectively absorbed or transmitted. Therefore, in greenhouse facilities using such a covering material, a working environment within the facilities is worsened by ultraviolet rays, and articles placed therein are also deteriorated. In addition, the interiors of the facilities are heated to considerably high temperatures by infrared rays during a season high in air temperature. Therefore, they cannot be used in cultivation of the crops, in particularly, the crops which are apt to be easily damaged by high temperatures.

SUMMARY OF THE INVENTION

The present invention has been made in view of the foregoing circumstances and has as its object the provision of absorbers of rays outside a visible region, which have optical properties that their light transmittances are high in the visible region and low in both ultraviolet and infrared wavelength regions.

According to the present invention, there is thus provided an absorber of rays outside a visible region, comprising a base composed of a transparent synthetic resin and electroconductive anhydrous zinc antimonate incorporated therein.

In the above absorber of rays outside the visible region (hereinafter may be referred to as "nonvisible rays"), a proportion of the electroconductive anhydrous zinc antimonate may preferably be from 0.1 to 5,000 parts by mass per 100 parts by mass of the synthetic resin forming the base.

According to the present invention, there is also provided an absorber of nonvisible rays, comprising a base composed of a transparent synthetic resin and a layer for absorbing the nonvisible rays, which is provided on the surface of the base and is formed of a synthetic resin and electroconductive anhydrous zinc antimonate incorporated in the synthetic resin.

In the above absorber of nonvisible rays, a proportion of the electroconductive anhydrous zinc antimonate may preferably be from 0.1 to 5,000 parts by mass per 100 parts by mass of the synthetic resin forming the nonvisible ray-absorbing layer.

According to the present invention, there is further provided an absorber of nonvisible rays, comprising a base composed of a transparent synthetic resin and a layer for absorbing the nonvisible rays, which is provided on the surface of the base and is formed of a deposit of electroconductive anhydrous zinc antimonate.

In each of the absorbers of nonvisible rays according to the present invention, the electroconductive anhydrous zinc antimonate may preferably be powder having a molar ratio of ZnO to $Sb_2O_5$ of 0.8 to 1.2 and a primary particle size of 5 to 200 nm.

The absorbers of nonvisible rays according to the present invention will hereinafter be described in detail.

In the absorbers of nonvisible rays according to the present invention, electroconductive anhydrous zinc antimonate is used as a component for absorbing the nonvisible rays. This electroconductive anhydrous zinc antimonate is obtained, for example, in accordance with the preparation process disclosed in Japanese Patent Application Laid-Open No. 219743/1994.

Japanese Patent Application Laid-Open No. 219743/1994 discloses a powder of electroconductive anhydrous zinc antimonate having a molar ratio of ZnO to $Sb_2O_5$ of 0.8 to 1.2 and a primary particle size of 5 to 200 nm and shows a process for preparing the powder of electroconductive anhydrous zinc antimonate by calcining a mixture containing a zinc compound, from which zinc oxide is formed by calcination, and an antimony compound, from which antimony oxide is formed by calcination, in a proportion that a molar ratio of ZnO to $Sb_2O_5$ will be 0.8 to 1.2.

More specifically, the electroconductive anhydrous zinc antimonate can be prepared by mixing the zinc compound, from which zinc oxide is formed by calcination, and the antimony compound, from which antimony oxide is formed by calcination, in a proportion that a molar ratio of ZnO to $Sb_2O_5$ in the electroconductive anhydrous zinc antimonate finally formed will be 0.8 to 1.2 and calcining the resultant mixture, for example, at 500 to 680° C.

As the zinc compound, from which zinc oxide is formed by calcination, is used at least one selected from the group consisting of zinc hydroxide, zinc oxide, zinc salts of inorganic acids and zinc salts of organic acids. These zinc compounds may be used in combination.

Examples of the zinc salts of inorganic acids include zinc carbonate, basic zinc carbonate, zinc nitrate, zinc chloride and zinc sulfate. Examples of the zinc salts of organic acids include zinc formate, zinc acetate and zinc oxalate. As these zinc compounds, may be used those commercially available as industrial products. When zinc hydroxide or zinc oxide is used, however, those having a primary particle size of 200 nm or smaller are preferred. The salts of acids, in which the acids are volatilized by calcination, i.e., the carbonate and the salts of the organic acids, are particularly preferred.

As the antimony compound, from which antimony oxide is formed by calcination, is preferably used colloidal antimony oxide having a primary particle size of 200 nm or smaller. Specific examples thereof include diantimony pentoxide sol, hexaantimony tridecoxide sol, hydrated diantimony tetroxide sol and colloidal diantimony trioxide.

The colloidal antimony oxide is preferably an acidic sol having a primary particle size of 2 to 200 nm and free of any base such as an amine or sodium.

As the antimony oxide sol, may be used that containing antimony oxide ($Sb_2O_5$, $Sb_6O_{13}$ or $Sb_2O_4$) at a concentration of 1 to 60 mass %. Such an oxide may also be dried by a method of spray drying, vacuum drying, freeze-drying or the like before its use.

Mixing of the above-described zinc compound and antimony compound can be carried out using any of various kinds of conventional stirrers and mixers under conditions of, for example, at 0 to 100° C. for 0.1 to 30 hours.

When an antimony oxide sol as described above is used as the colloidal antimony oxide, its mixture with the zinc compound is preferably dried before calcination.

The drying of the mixture (slurry) of the zinc compound and the antimony oxide sol may be conducted using a suitable dryer such as a spray dryer. The drying temperature is preferably 500° C. or lower, particularly, 300° C. or lower.

Calcination of the zinc compound and antimony compound is carried out by heating, for example, a mixture of the zinc compound and the antimony oxide sol, a mixture of the zinc compound and the dried product of the antimony oxide sol, or a mixture of the zinc compound and the colloidal diantimony trioxide. The calcination is performed at a temperature of 500 to 1,100° C., preferably 550 to 680° C., for 0.5 to 50 hours, preferably 2 to 20 hours.

By the calcination, a solid phase reaction is caused between the zinc compound and the antimony compound, whereby the electroconductive anhydrous zinc antimonate is formed.

In the present invention, the powder of electroconductive anhydrous zinc antimonate used as a component for absorbing the nonvisible rays preferably has a specific resistance of 5,000 Ω-cm or lower.

If the specific resistance of the powder is higher than 5,000 Ω-cm, the performance of the resulting absorber for absorbing infrared rays becomes insufficient. It is hence not preferable to use any powder having such a high specific resistance.

Besides, the powder of electroconductive anhydrous zinc antimonate used as a component for absorbing the nonvisible rays is preferably fine powder of the colloidal level that has a primary particle size of 5 to 200 nm.

If the primary particle size of the powder exceeds 200 nm, the transmittance of rays within a visible region is reduced, so that an absorber of nonvisible rays having excellent transparency may not be obtained. If the primary particle size is smaller than 5 nm on the other hand, such fine particles tend to aggregate. It is hence difficult to uniformly disperse such electroconductive anhydrous zinc antimonate in a synthetic resin, and besides it is very difficult to produce such electroconductive anhydrous zinc antimonate itself.

Since the electroconductive anhydrous zinc antimonate obtained by the above-described calcination is sintered only to a low extent, even its agglomerate may be easily ground using a conventional wet grinding process in which a grinding treatment is conducted in water or a suitable organic solvent. Such a compound does not form a hydrous salt even when it is ground or heated in water.

When the electroconductive anhydrous zinc antimonate is subjected to wet grinding as described above to form electroconductive anhydrous zinc antimonate sol using water or an organic solvent as a dispersion medium, an alkylamine such as ethylamine, propylamine, isopropylamine or diisobutylamine, an alkanolamine such as triethanolamine or monoethanolamine, a diamine such as ethylenediamine, or an oxycarboxylic acid such as lactic acid, tartaric acid, malic acid or citric acid may be added as a stabilizer as needed.

In the above, as the organic solvent, may be used an alcohol such as methyl alcohol, ethyl alcohol, propyl alcohol or butyl alcohol, a glycol such as ethylene glycol, diethylene glycol or hexylene glycol, a cellosolve such as ethyl cellosolve or propyl cellosolve, an amide such as dimethylformamide or dimethylacetamide, or the like.

The primary particle size of the electroconductive anhydrous zinc antimonate in the above-described aqueous sol or organic solvent sol is 200 nm or smaller.

The electroconductive anhydrous zinc antimonate preferably has a molar ratio of ZnO to $Sb_2O_5$ of 0.8 to 1.2. If the molar ratio is lower than 0.8, unreacted antimony oxide remains in the resulting absorbent component. If the molar ratio is higher than 1.2 on the other hand, the resulting absorbent component becomes a mixture with unreacted zinc oxide. Molar ratios of ZnO to $Sb_2O_5$ outside the above range result in no absorbent component having a good transmission property to rays within a visible region and exhibiting good absorption property to nonvisible rays.

The absorber of nonvisible rays according to the present invention is in a form of the following embodiments (a) to (c):

(a) an absorber of nonvisible rays, comprising a base composed of a transparent synthetic resin and the electroconductive anhydrous zinc antimonate incorporated therein;

(b) an absorber of nonvisible rays, comprising a base composed of a transparent synthetic resin and a layer for absorbing the nonvisible rays (hereinafter may be referred to as "dispersion type layer"), which is provided on the surface of the base and is formed of a synthetic resin and the electroconductive anhydrous zinc antimonate incorporated in the synthetic resin; and (c) an absorber of nonvisible rays, comprising a base composed of a transparent synthetic resin and a layer for absorbing the nonvisible rays (hereinafter may be referred to as "deposit type layer"), which is provided on the surface of the base and is formed of a deposit of the electroconductive anhydrous zinc antimonate.

No particular limitation is imposed on the synthetic resin for forming each base so far as it has good transparency. Specific examples thereof may include thermoplastic resins, such as acrylic resins such as polymethyl methacrylate, vinyl chloride resins such as polyvinyl chloride, vinyl chloride-vinyl acetate copolymers and chlorinated vinyl chloride resins, styrene resins such as polystyrene and acrylonitrile-styrene copolymers, polyester resins such as polycarbonate, polyethylene terephthalate and polybutylene terephthalate, polyurethane resins, polyamide resins, fluorocarbon resins, polyvinyl alcohol resins, alkyd resins, and epoxy resins, and transparent thermosetting resins and photo-setting resins.

The absorber of nonvisible rays according to the embodiment (a), in which the electroconductive anhydrous zinc antimonate is incorporated in the base, is obtained, for example, by mixing any of the synthetic resins mentioned above and the electroconductive anhydrous zinc antimonate to prepare a resin composition containing the electroconductive anhydrous zinc antimonate and molding or forming the resin composition.

As methods for preparing the resin composition, may be mentioned a method of mixing the synthetic resin and the electroconductive anhydrous zinc antimonate by means of a high-speed stirring mixer such as a Henschel mixer, or any other blender, a method of kneading and mixing the synthetic resin and the electroconductive anhydrous zinc antimonate by means of a roll kneader or extruder, and the like.

As a process for molding or forming the resin composition to produce the base, may be used an injection molding, calendering or extruding process, or any other molding or forming and processing processes for synthetic resins.

When a thermosetting or photo-setting resin is used as the synthetic resin, the absorber of nonvisible rays may also be produced by a casting polymerization of a monomer composition containing a monomer or monomers for obtaining such a setting resin and the electroconductive anhydrous zinc antimonate.

In the absorber of nonvisible rays according to the embodiment (b), in which the dispersion type layer is provided on the surface of the base, no particular limitation is imposed on the synthetic resin for forming the dispersion type layer so far as it is high in transmittance of rays within a visible region, i.e., excellent in transparency. Specific examples thereof include the thermoplastic resins, and transparent thermosetting resins and photo-setting resins which have been exemplarily mentioned above as the synthetic resins used in forming the base.

The dispersion type layer is formed by applying a dispersion type layer-forming fluid, which contains powder of the electroconductive anhydrous zinc antimonate, to the surface of the base and subjecting the thus-applied fluid to necessary treatment(s).

When a thermoplastic resin is used as the synthetic resin for forming the dispersion type layer, an organic solvent is used as a medium for the preparation of the dispersion type layer-forming fluid.

Examples of the organic solvent used include alcohols such as methyl alcohol, ethyl alcohol, butyl alcohol and hexyl alcohol, ketones such as acetone, methyl ethyl ketone, methyl isobutyl ketone and cyclohexanone, esters such as ethyl acetate, butyl acetate and cellosolve acetate, cyclic ethers such as dioxane and tetrahydrofuran, halogenated hydrocarbons such as methylene chloride and chloroform, aromatic hydrocarbons such as xylene, toluene and benzene, as well as organic compounds such as cyclohexane, dimethylformamide, dimethylacetamide and acetonitrile, and mixtures thereof, and the like.

Any of these organic solvents is mixed with powder of the electroconductive anhydrous zinc antimonate and the thermoplastic resin, thereby preparing the dispersion type layer-forming fluid. The dispersion type layer-forming fluid is applied to the surface of the base and dried, thereby forming the dispersion type layer.

When an acrylic resin, or a thermosetting or photo-setting resin is used as the synthetic resin for forming the dispersion type layer, a precursor of such a resin, for example, an acrylic ester monomer, is mixed with powder of the electroconductive anhydrous zinc antimonate and any of the same organic solvents as mentioned above, which is used as needed, thereby preparing a polymerizable dispersion type layer-forming fluid. The polymerizable dispersion type layer-forming fluid is applied to the surface of the base, dried and subjected to a heat treatment or an irradiation treatment with ultraviolet light, thereby forming the dispersion type layer.

As examples of usable acrylic ester monomers include methyl (meth)acrylate, ethyl (meth) acrylate, n-butyl (meth) acrylate, t-butyl (meth)acrylate, isobutyl (meth)acrylate, 2-ethylhexyl (meth)acrylate, isodecyl (meth)acrylate, n-lauryl (meth)acrylate, tridecyl (meth)acrylate, n-stearyl (meth)acrylate, isobornyl (meth)acrylate, urethane-modified (meth)acrylates, pentaerythritol (meth)acrylates and ethylene glycol (meth)acrylates. These compounds may be used either singly or in any combination thereof.

Among the setting resins, the photo-setting resins, particularly, crosslinked polymers obtained from a composition composed mainly of photo-polymerizable monomer which is easily polymerized by irradiation of ultraviolet light or the like, are preferred because a polymerizable dispersion type layer-forming fluid, which is a liquid mixture containing a precursor of the polymer, has a long pot life, is easy to be handled, can be cured without heating and permits the formation of a dispersion type layer high in surface hardness and excellent in performance properties such as chemical resistance and heat resistance.

The dispersion type layer may also be formed by laminating a molded or formed product for the dispersion type layer comprised of a synthetic resin containing the electroconductive anhydrous zinc antimonate therein on the surface of the base and bonding them to each other.

The molded or formed product for the dispersion type layer can be produced by the same process as that for the absorber of nonvisible rays according to the embodiment (a).

When the molded or formed product for the dispersion type layer is bonded to the surface of the base with an adhesive or pressure-sensitive adhesive, a thermosetting or photo-setting type adhesive having excellent transparency, for example, an epoxy, urethane or acrylic adhesive, or an acrylic pressure-sensitive adhesive having excellent transparency and weather resistance may preferably be used.

As described above, in the absorber of nonvisible rays according to the embodiment (a) or (b), the electroconductive anhydrous zinc antimonate is incorporated in the base or dispersion type layer. A proportion of the electroconductive anhydrous zinc antimonate incorporated is selected within a range of preferably from 0.1 to 5,000 parts by mass, more preferably from 1 to 5,000 parts by mass per 100 parts by mass of the synthetic resin for forming the base or the dispersion type layer.

More specifically, the proportion of the electroconductive anhydrous zinc antimonate is selected according to the thickness of the base or dispersion type layer. For example, when the base or dispersion type layer is in the form of a thick sheet or plate, the electroconductive anhydrous zinc antimonate is incorporated in a proportion of preferably 0.1 to 10 parts by mass, more preferably 0.1 to 5 parts by mass per 100 parts by mass of the synthetic resin. When the base or dispersion type layer is in the form of a thin film or membrane on the other hand, the electroconductive anhydrous zinc antimonate is incorporated in a proportion of preferably 10 to 5,000 parts by mass per 100 parts by mass of the synthetic resin.

If the proportion is lower than 0.1 parts by mass, a good absorption property to nonvisible rays may not be achieved in some cases. If the proportion is higher than 5,000 parts by mass on the other hand, it is difficult to uniformly disperse the electroconductive anhydrous zinc antimonate in the synthetic resin, and besides it may be difficult in some cases to obtain the base itself or the dispersion type layer itself.

In the absorber of nonvisible rays according to the embodiment (c), in which the deposit type layer is provided on the surface of the base, the thickness of the deposit type layer is preferably 0.1 to 100 μm, particularly 0.1 to 10 μm. If the thickness of the deposit type layer is too great, the transmittance of rays within a visible region in the deposit type layer is reduced, and so the too great thickness is not preferable. If the thickness of the deposit type layer is too small on the other hand, the transmittance of rays outside the visible region in the deposit type layer becomes high, and so it is difficult to achieve the intended optical properties.

The deposit type layer is formed by any suitable process, for example, by applying a fluid dispersion for forming the deposit type layer, in which powder of the electroconductive anhydrous zinc antimonate is dispersed, to the surface of the base and drying it.

An organic solvent may be used as a medium for the preparation of the fluid dispersion for forming the deposit type layer. Specific examples thereof include those exemplarily mentioned above as to the preparation of the dispersion type layer-forming fluid.

When such a deposition type layer is provided, it is preferable to provide a protective layer on the surface of the deposition type layer. This protective layer imparts surface hardness necessary for practical use to the deposition type layer. As a material for forming such a protective layer, may be used a synthetic resin having excellent transparency. Specific examples thereof include the thermoplastic resins, and transparent thermosetting resins and photo-setting resins which have been exemplarily mentioned above as the synthetic resins for forming the base.

Such a protective layer can be formed by any suitable means. Examples thereof include (1) a means in which a solution for forming the protective layer is prepared by dissolving the synthetic resin in an organic solvent, and the thus-prepared solution for forming the protective layer is applied to the surface of the deposit type layer and dried, (2) a means in which a polymerizable solution for forming the protective layer, which contains a monomer for providing the synthetic resin, is prepared, the solution for forming the protective layer is applied to the surface of the deposit type layer, and the monomer is then polymerized, and (3) a means in which a film for the protective layer is laminated on the surface of the deposit type layer and bonded thereto.

In order to enhance the adhesion between the dispersion type layer or deposit type layer and the base upon the formation of the former on the surface of the latter as described above, the surface of the base may be subjected to any known surface treatment, for example, primer coating, corona discharge treatment or any other physical or chemical pretreatment.

In the absorbers of nonvisible rays according to the present invention, a stabilizer, lubricant, plasticizer, antioxidant, ultraviolet absorbent, infrared absorbent, pigment, impact modifier, filler, processing aid and other additives may be incorporated in the base, dispersion type layer or protective layer.

For example, when a vinyl chloride resin is used as the synthetic resin for forming the base, dispersion type layer or protective layer, a phosphate plasticizer such as tricresyl phosphate or triphenyl phosphate, a phthalic plasticizer such as dioctyl phthalate or dibutyl phthalate, a fatty acid plasticizer such as dibutyl sebacate, butyl ricinoleate, methylacetyl ricinoleate or butyl succinate, or a glycol plasticizer such as butyl phthalylbutyl glycolate, triethylene glycol dibutyrate, triethylene glycol di-2-ethylbutyrate or polyethylene glycol may be used.

Industrial Applicability

Since the absorbers of nonvisible rays according to the present invention use the electroconductive anhydrous zinc antimonate as a component for absorbing the nonvisible rays, their light transmittances are low in both ultraviolet and infrared regions and high in a visible region. Accordingly, the absorbers of nonvisible rays are useful for application to uses that are required to prevent exposure to infrared rays or ultraviolet rays or both rays.

For example, the absorber of nonvisible rays according to the present invention is used as an agricultural covering material for constructing greenhouse facilities by covering a plantation atmosphere therewith, whereby a temperature rise within the facilities can be controlled during a season high in air temperature, for example, the summer season, and so the period of service of the greenhouse facilities can be widened.

In addition, the absorbers of nonvisible rays according to the present invention can be applied to window materials for buildings, automobiles, vehicles and the like.

BEST MODE FOR CARRYING OUT THE INVENTION

The present invention will hereinafter be described with reference to the following examples. However, the present invention is not limited to and by these examples. Incidentally, all designations of "part" or "parts" and "%" as to content proportion as will be used in the following examples mean part or parts by mass and mass %, respectively.

[Preparation of Electroconductive Anhydrous Zinc Antimonate]

Dispersed in 5,587 g of water were 1,300 g of diantimony trioxide (product of Mikuni Seiren Co., Ltd.), and 953.7 g of 35% aqueous hydrogen peroxide were then added. The mixture was heated to 90 to 100° C. to conduct a reaction for 2 hours, thereby obtaining diantimony pentoxide sol. The thus-obtained sol had a specific gravity of 1.198, a pH of 1.80, a viscosity of 19.5 cP, a diantimony pentoxide ($Sb_2O_5$) concentration of 18.4%, a particle size of 20 to 30 nm as measured by observation through a transmission electron microscope, and a specific surface area of 55.0 $m^2/g$ as measured by the BET method.

Added to 8,600 g of the diantimony pentoxide sol ($Sb_2O_5$ concentration: 18.4%) were 300 g of water to dilute the sol, and 238.1 g of basic zinc carbonate (product of Sakai Chemical Industry Co., Ltd.; containing zinc of 70% in terms of ZnO) were added to the diluted sol with stirring. Both components were mixed and stirred at 100° C. (under reflux) for 11 hours to obtain a slurry. The slurry contained 2.44% of ZnO and 9.69% of $Sb_2O_5$ and had a molar ratio of ZnO to $Sb_2O_5$ of 1.0.

The slurry was filtered by means of suction and subjected to flood washing, thereby obtaining a wet cake. This wet cake was dried at 150° C. by means of a hot-air drier. The dried product was ground by a Henschel mixer into powder. The X-ray diffractometry of this powder revealed that a peak of the X-ray diffraction pattern conformed to a peak of hydrous diantimony pentoxide ($Sb_2O_5.xH_2O$), and any other peak was not observed.

This powder is calcined at 630° C. for 13 hours in an electric furnace, thereby obtaining bluish-green powder. The X-ray diffractometry of this bluish-green powder revealed that a peak of the X-ray diffraction pattern conformed to a peak of anhydrous zinc antimonate. The bluish-green powder was press molded under conditions of 100 kg/$cm^2$ to measure the specific resistance of the molded product. As a result, it was found that the powder had a specific resistance of 100 Ω-cm and was hence electroconductive.

Added to 400 g of water were 118 g of the bluish-green powder, and the mixture was subjected to a dispersion treatment for 96 hours in a ball mill containing glass beads having a diameter of 2 to 3 mm. The beads were then separated, thereby obtaining 1131.2 g of aqueous sol of the electroconductive anhydrous zinc antimonate.

This aqueous sol was concentrated by a rotary evaporator to the whole mass of 522 g. The concentrated aqueous sol of the electroconductive anhydrous zinc antimonate was of a transparent, bluish-green color and had a specific gravity of 1.228, a pH of 8.32, a viscosity of 2.0 cP, an electric conductivity of 411 µs/cm and a $ZnSb_2O_6$ concentration of 22.6%. The primary particle size of $ZnSb_2O_6$ in the aqueous sol was 10 to 50 nm as measured by observation through a transmission electron microscope, 97.5 nm as measured by a particle size distribution meter according to the laser scattering method and 70 nm as measured by the centrifugal sedimentation method.

The aqueous sol was dried to obtain powder of the electroconductive anhydrous zinc antimonate. The specific surface area of this powder was measured by the BET method and was found to be 37.6 $m^2/g$. The particle size of the powder calculated out from this specific surface area was 25 nm.

EXAMPLE 1

The powder of the electroconductive anhydrous zinc antimonate was dispersed in methyl alcohol as an organic solvent to prepare a dispersion containing the electroconductive anhydrous zinc antimonate in a proportion of 20.8%.

On the other hand, 39.9 parts of 0.001N hydrochloric acid were added dropwise to 174.4 parts of γ-glycidoloxypropyltrimethoxysilane while stirring at room temperature. After completion of the addition of hydrochloric acid, the mixture was stirred for additional 20 hours to conduct a reaction. Thereafter, the reaction mixture was left to stand for 15 hours to obtain a partial condensate.

To 214.3 parts of the partial condensate were added 384.6 parts of the above dispersion of the electroconductive anhydrous zinc antimonate, 396.7 parts of methyl alcohol, 2.4 parts of acetylacetonatoaluminum and 2.0 parts of a silicone type surface smoothing agent, and the resultant mixture was stirred for about 4 hours, thereby preparing a dispersion type layer-forming fluid containing 20% of solids (proportion of the electroconductive anhydrous zinc antimonate in the solids: 40%).

The dispersion type layer-forming fluid was applied to one side surface of a plate-like base 1 mm thick composed of polycarbonate by a dipping process under conditions of a pulling-up rate of 30 mm/min and then precured under conditions of at 60° C. for 10 minutes and further cured under conditions of at 120° C. for 3 hours, thereby producing an absorber of nonvisible rays, in which a dispersion type layer 3 µm thick was formed on the surface of the base composed of polycarbonate.

Light transmittances of the absorber of nonvisible rays were measured. The results are shown in Table 1.

EXAMPLE 2

A dispersion of the electroconductive anhydrous zinc antimonate was prepared by dispersing 40 parts of the electroconductive anhydrous zinc antimonate in 53 parts of a mixed organic solvent obtained by mixing toluene and methyl ethyl ketone at a mass ratio of 1:1.

Seven parts of a polyester resin (Eryter; product of Unichika, Ltd.) were mixed with and dissolved in the dispersion of the electroconductive anhydrous zinc antimonate as above, thereby preparing a dispersion type layer-forming fluid containing 47% of solids (proportion of the electroconductive anhydrous zinc antimonate in the solids: 85.1%).

The dispersion type layer-forming fluid was applied to one side surface of a filmy base 50 µm thick composed of polyester by a bar coater. The thus-coated filmy base was then left to stand for 1 hour in an oven controlled at 100° C. to evaporate the solvent, thereby producing an absorber of nonvisible rays, in which a dispersion type layer 2 µm thick was formed on the surface of the base composed of polyester.

Light transmittances of the absorber of nonvisible rays were measured. The results are shown in Table 1.

EXAMPLE 3

The powder of the electroconductive anhydrous zinc antimonate was dispersed in a plasticizer, dioctyl phthalate (DOP), to prepare a dispersion containing the electroconductive anhydrous zinc antimonate in a proportion of 5%.

Fifty parts of this dispersion were charged into a Henschel mixer together with 100 parts of a vinyl chloride resin (PVC S-903; product of Kureha Kagaku Kogyo Co., Ltd.) having an average polymerization degree of 1,300, 2.5 parts of a barium/zinc composite stabilizer (BZ-350M/PSE-120B=1.5 parts/1.0 part; product of Katsuta Kako K.K.), 4.0 parts of epoxidized soybean oil and 0.3 parts of bisamide, and the contents were stirred and mixed in a state that they were heated to give a powder temperature of 110° C., thereby preparing a vinyl chloride resin composition containing the electroconductive anhydrous zinc antimonate.

The vinyl chloride resin composition was formed into a film 100 µm thick by means of a calendering machine, thereby producing an absorber of nonvisible rays, in which the electroconductive anhydrous zinc antimonate was dispersed in the base composed of the vinyl chloride resin.

Light transmittances of the absorber of nonvisible rays were measured. The results are shown in Table 1.

EXAMPLE 4

A dispersion of the electroconductive anhydrous zinc antimonate was prepared in the same manner as in Example 1. The dispersion was applied to one side surface of a base composed of polyethylene terephthalate (PET) film 50 µm thick (product of Toyobo Co., Ltd.) by a bar coater process. The thus-coated base was left to stand for 1 hour in an oven controlled at 50° C. to evaporate methyl alcohol, thereby forming a deposit type layer 1 µm thick. A transparent protective layer 5 µm thick was formed on the deposit type layer using a coating formulation, "Clear Color" (product of Atom Paint K.K.) containing an alkyd resin, thereby producing an absorber of nonvisible rays, in which the deposit type layer and the protective layer were laminated in that order on the surface of the base.

Light transmittances of the absorber of nonvisible rays were measured. The results are shown in Table 1.

|  |  | Ex. 1 | Ex. 2 | Ex. 3 | Ex. 4 |
|---|---|---|---|---|---|
| Light transmittance (%) | Wavelength 350 nm | 8 | 5 | 6 | 3 |
|  | Wavelength 400 nm | 40 | 35 | 40 | 30 |
|  | Wavelength 500 nm | 72 | 70 | 75 | 65 |
|  | Wavelength 600 nm | 73 | 70 | 76 | 68 |
|  | Wavelength 700 nm | 63 | 68 | 72 | 58 |
|  | Wavelength 800 nm | 52 | 58 | 65 | 47 |
|  | Wavelength 900 nm | 45 | 50 | 54 | 41 |
|  | Wavelength 1000 nm | 40 | 41 | 48 | 35 |
|  | Wavelength 1100 nm | 35 | 28 | 37 | 31 |
|  | Wavelength 1200 nm | 28 | 20 | 30 | 22 |
|  | Wavelength 1300 nm | 10 | 4 | 13 | 11 |
|  | Wavelength 2000 nm | 2 | 1 | 1 | 1 |

As apparent from Table 1, it was confirmed that the absorbers of nonvisible rays according to Examples 1 to 4 are sufficiently high in light transmittances in a wavelength region from 400 to 800 nm, i.e., a visible region, and low in light transmittances in both ultraviolet region on the side of wavelengths shorter than this wavelength region and infrared region on the side of wavelengths longer than this wavelength region, namely have good absorption property to nonvisible rays.

What is claimed is:

1. A method of absorbing rays outside a visible region comprising applying to a window exposed to a source of rays outside a visible region an absorber comprising a base including a transparent synthetic resin and having electroconductive anhydrous zinc antimonate incorporated therein.

2. The method of absorbing rays outside a visible region according to claim 1, wherein a proportion of the electroconductive anhydrous zinc antimonate is from 0.1 to 5,000 parts by mass per 100 parts by mass of the synthetic resin forming the base.

3. The method of absorbing rays outside a visible region according to claim 1 wherein the electroconductive anhydrous zinc antimonate is a powder having a molar ratio of ZnO to $Sb_2O_5$ of 0.8 to 1.2 and a primary particle size of 5 to 200 nm.

4. The method of absorbing rays outside a visible region according to claim 2, wherein the electroconductive anhydrous zinc antimonate is a powder having a molar ratio of ZnO to $Sb_2O_5$ of 0.8 to 1.2 and a primary particle size of 5 to 200 nm.

5. The method of absorbing rays outside a visible region according to claim 4, wherein the electroconductive anhydrous zinc antimonate comprises a powder having a specific resistance of 5,000 $\Omega$-cm or lower.

6. The method of absorbing rays outside a visible region according to claim 5, wherein the transparent resin is selected from the group consisting of polymethyl methacrylate, polyvinyl chloride, a vinyl chloride-vinyl acetate copolymer, a chlorinated vinyl chloride resin, polystyrene, an acrylonitrile-styrene copolymer, polycarbonate, polyethylene terephthalate, polybutylene terephthalate, polyurethane, polyamide, a fluorocarbon resin, a polyvinyl alcohol resin, an alkyd resin, an epoxy resin, a transparent thermosetting resin and a transparent photo-setting resin.

7. A method of absorbing rays outside a visible region on a structure of a greenhouse comprising constructing the greenhouse with an absorber comprising a base including a transparent synthetic resin and having electroconductive anhydrous zinc antimonate incorporated therein.

8. A method of absorbing rays outside a visible region comprising applying to a window exposed to a source of rays outside a visible region an absorber comprising a base including a transparent synthetic resin and a layer for absorbing the rays outside the visible region, which is provided on the surface of the base and is formed of a synthetic resin and having electroconductive anhydrous zinc antimonate incorporated in the synthetic resin.

9. The method of absorbing rays outside a visible region according to claim 8, wherein a proportion of the electroconductive anhydrous zinc antimonate is from 0.1 to 5,000 parts by mass per 100 parts by mass of the synthetic resin forming the layer for absorbing the rays outside the visible region.

10. The method of absorbing rays outside a visible region according to claim 8, wherein the electroconductive anhydrous zinc antimonate is a powder having a molar ratio of ZnO to $Sb_2O_5$ of 0.8 to 1.2 and a primary particle size of 5 to 200 nm.

11. The method of absorbing rays outside a visible region according to claim 9, wherein the electroconductive anhydrous zinc antimonate is a powder having a molar ratio of ZnO to $Sb_2O_5$ of 0.8 to 1.2 and a primary particle size of 5 to 200 nm.

12. The method of absorbing rays outside a visible region according to claim 11, wherein the electroconductive anhydrous zinc antimonate comprises a powder having a specific resistance of 5,000 $\Omega$-cm or lower.

13. The method of absorbing rays outside a visible region according to claim 12, wherein the transparent resin is selected from the group consisting of polymethyl methacrylate, polyvinyl chloride, a vinyl chloride-vinyl acetate copolymer, a chlorinated vinyl chloride resin, polystyrene, an acrylonitrile-styrene copolymer, polycarbonate, polyethylene terephthalate, polybutylene terephthalate, polyurethane polyamide, a fluorocarbon resin, a polyvinyl alcohol resin, an alkyd resin, an epoxy resin, a transparent thermosetting resin and a transparent photo-setting resin.

14. A method of absorbing rays outside a visible region on a structure of a greenhouse comprising constructing the greenhouse with an absorber comprising a base including a transparent synthetic resin and a layer for absorbing the rays outside the visible region, which is provided on the surface of the base and is formed of a synthetic resin and having electroconductive anhydrous zinc antimonate incorporated in the synthetic resin.

15. A method of absorbing rays outside a visible region comprising applying to a window exposed to a source of rays outside a visible region an absorber comprising a base including a transparent synthetic resin and a layer for absorbing the rays outside the visible region, which is provided on the surface of the base and is formed of a deposit of electroconductive anhydrous zinc antimonate.

16. A method of absorbing rays outside a visible region on a structure of a greenhouse comprising constructing the greenhouse with an absorber comprising a base including a transparent synthetic resin and a layer for absorbing the rays outside the visible region, which is provided on the surface of the base and is formed of a deposit of electroconductive anhydrous zinc antimonate.

17. The method of absorbing rays outside a visible region according to claim 16, wherein a protective layer is formed on the surface of the layer for absorbing the rays outside the visible region, which is formed of the deposit of the electroconductive anhydrous zinc antimonate.

18. The method of absorbing rays outside a visible region according to claim 16, wherein the electroconductive anhydrous zinc antimonate is a powder having a molar ratio of ZnO to $Sb_2O_5$ of 0.8 to 1.2 and a primary particle size of 5 to 200 nm.

19. The method of absorbing rays outside a visible region according to claim 17, wherein the electroconductive anhydrous zinc antimonate is a powder having a molar ratio of ZnO to $Sb_2O_5$ of 0.8 to 1.2 and a primary particle size of 5 to 200 nm.

20. The method of absorbing rays outside a visible region according to claim 18, wherein the electroconductive anhydrous zinc antimonate comprises a powder having a specific resistance of 5,000 $\Omega$-cm or lower.

21. The method of absorbing rays outside a visible region according to claim 20, wherein the transparent resin is selected from the group consisting of polymethyl methacrylate, polyvinyl chloride, a vinyl chloride-vinyl acetate copolymer, a chlorinated vinyl chloride resin, polystyrene, an acrylonitrile-styrene copolymer, polycarbonate, polyethylene terephthalate, polybutylene terephthalate, polyurethane, polyamide, a fluorocarbon resin, a polyvinyl alcohol resin, an alkyd resin, an epoxy resin, a transparent thermosetting resin and a transparent photo-setting resin.

* * * * *